United States Patent [19]

Paik et al.

[11] Patent Number: 5,216,503
[45] Date of Patent: Jun. 1, 1993

[54] STATISTICAL MULTIPLEXER FOR A MULTICHANNEL IMAGE COMPRESSION SYSTEM

[75] Inventors: Woo H. Paik, Encinitas; Edward A. Krause, San Diego; Vincent Liu, San Gabriel; Paul Shen, San Diego; Henry Derovanessian, La Jolla, all of Calif.

[73] Assignee: General Instrument Corporation, Hatboro, Pa.

[21] Appl. No.: 809,561

[22] Filed: Dec. 24, 1991

[51] Int. Cl.$^5$ ............................................... H04N 7/12
[52] U.S. Cl. .................................................. 358/133
[58] Field of Search ................ 358/133, 141, 135, 136

[56] References Cited

U.S. PATENT DOCUMENTS

| | | | |
|---|---|---|---|
| 4,442,454 | 4/1984 | Powell | 358/167 |
| 4,922,341 | 5/1990 | Strobach | 358/133 X |
| 4,941,042 | 7/1990 | Martens | 358/133 |
| 4,979,049 | 12/1990 | Chamzas et al. | 358/133 X |
| 4,984,076 | 1/1991 | Watanabe et al. | 358/133 |
| 5,115,309 | 5/1992 | Hang | 358/133 |

OTHER PUBLICATIONS

W. Paik, "DigiCipher-All Digital, Channel Compatible, HDTV Broadcast System," *IEEE Transactions on Broadcasting*, vol. 36, No. 4, Dec. 1990.

*Primary Examiner*—Victor R. Kostak
*Attorney, Agent, or Firm*—Barry R. Lipsitz

[57] ABSTRACT

A multichannel image compression system uses a plurality of encoders to compress image data. A coding level command is provided to each of the encoders to specify a level of quality to be provided by each encoder. Encoded image data, provided by the encoders in response to the coding level command, is multiplexed into a combined signal for transmission. The coding level command is adjusted in response to an accumulated amount of data from the combined signal, to maintain the accumulated data within a throughput capability of a communication channel. Although the coding level command may specify a global coding level that is the same for all of the encoders, the encoders can derive local coding levels from the global coding level to provide different encoding qualities. Decoder apparatus is provided to recover an image from the compressed image data.

15 Claims, 4 Drawing Sheets

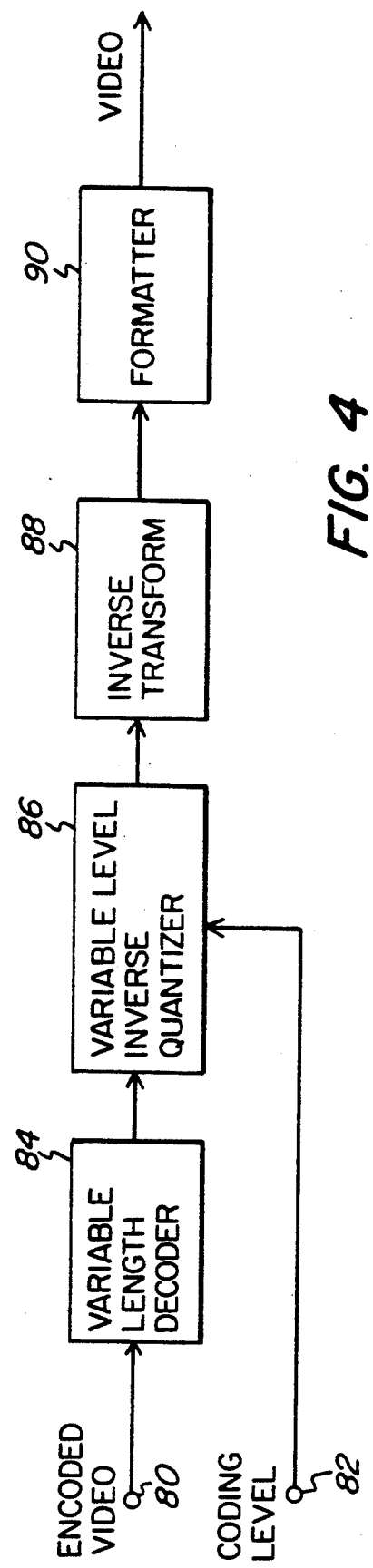

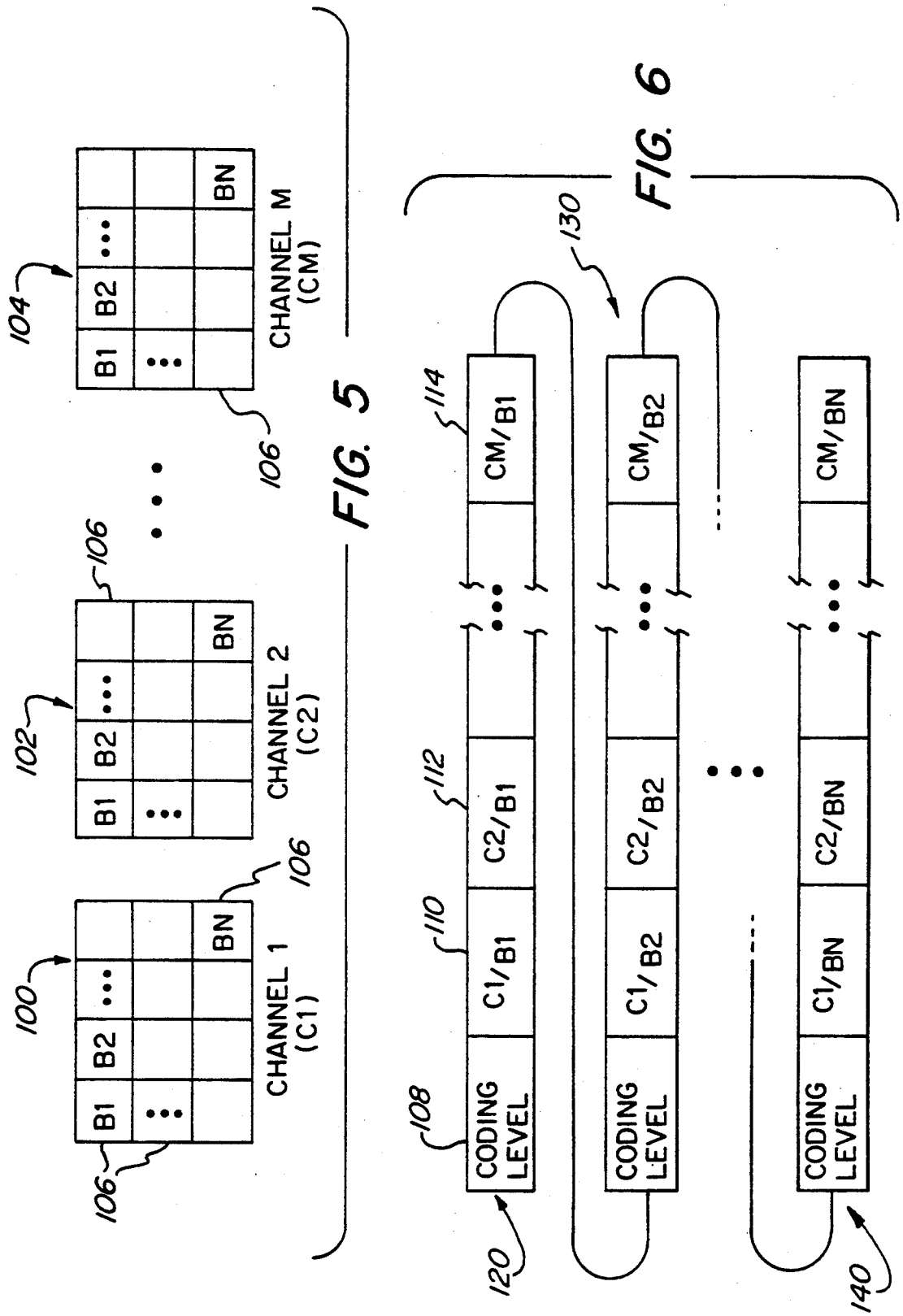

STATISTICAL MULTIPLEXER FOR A MULTICHANNEL IMAGE COMPRESSION SYSTEM

BACKGROUND OF THE INVENTION

The present invention relates to digital compression systems for high definition television (HDTV) applications or the like, and more particularly to the communication of multiple channels of compressed video data via a multiplexed data stream.

Various different digital compression systems are known in the art for reducing the amount of data needed to adequately represent a sequence of video images. An example of such a system is provided in Paik, "DigiCipher - All Digital, Channel Compatible, HDTV Broadcast System," *IEEE Transactions on Broadcasting*, Vol. 36, No. 4, December 1990, incorporated herein by reference. In the system described in the aforementioned article, motion compensation is also provided to further enhance the image compression. The use of such systems makes it possible to achieve compression ratios in excess of 100 to 1. Most of the video compression algorithms used in these systems take advantage of statistical properties of the image. Occasionally, certain sequences of images will be encountered where these statistical properties do not apply. In such cases, a constant compression ratio cannot be maintained without visibly impairing the resulting image. In general, the variation in picture quality increases as compression systems become more powerful and more sophisticated. Usually, it is only the average compression ratio that is improved by such systems.

One method for reducing the variability of the statistical properties of video imagery is to simultaneously encode multiple video channels. If the quality of the reconstructed video signal is fixed, then the amount of data required to represent the signal after applying a particular compression algorithm can be described as a random variable. The total amount of data needed to represent n video channels is therefore the sum of n random variables. Assuming that each video channel carries different program material, then each of the video signals will be uncorrelated, and the variance of the sum of video signals will be much less than the variance observed by compressing a single channel independently.

It would be advantageous to provide a statistical multiplexer to process a plurality of video channels in a variable bit rate digital video compression system. The use of such a multiplexer would facilitate the achievement of a targeted compression ratio without introducing visible artifacts into reconstructed video images. Such a multiplexer should enable the transmission of multiple channel data without exceeding the throughput capability of a communication channel over which the data is communicated. The present invention provides a statistical multiplexer having the aforementioned advantages.

SUMMARY OF THE INVENTION

In accordance with the present invention, a multichannel image compression system is provided. A plurality of encoders compress image data from different video channels. Coding level control means are coupled to provide a coding level command to each of the encoders for specifying a level of quality to be provided by each encoder. Means are provided for multiplexing encoded image data, provided by the encoders in response to the coding level control means, into a combined signal for transmission.

In a preferred embodiment, the coding level control means are responsive to an accumulated amount of data from the combined signal for adjusting the coding level command to maintain the accumulated data within a throughput capability of a communication channel. The coding level command can specify a global coding level that is the same for all of the encoders. Means operatively associated with at least one of the encoders can be provided to generate a local coding level for use by the encoder. The local coding level may differ from the global coding level, for example, when the picture quality of a particular channel is determined to be more important than that of other channels.

Decoder apparatus is provided in accordance with the invention for recovering the image data for individual channels from the combined signal. Such decoder apparatus comprises means for demultiplexing the combined signal to retrieve the encoded image data provided by each encoder. A plurality of decoders is provided, each coupled to the demultiplexing means for decoding the image data provided by a corresponding encoder. Means are provided for recovering the coding level command from received data. The individual decoders are responsive to the recovered coding level command to decode the encoded image data.

In a preferred embodiment of the decoder, the coding level command specifies a global coding level that is the same for all of the encoders. The coding level command is multiplexed with the combined signal prior to transmission, and recovered by a demultiplexer provided in the decoder apparatus. If desired, a local coding level can be generated for one or more of the video encoders. Means operatively associated with such an encoder generate the local coding level for use by the encoder. The local coding level may differ from the global coding level. Means operatively associated with a corresponding decoder reproduce the local coding level for use by the decoder.

In an alternate embodiment, the coding level command is not multiplexed with the combined signal prior to transmission. Instead, means are provided at the decoder apparatus for reproducing the coding level command from an accumulated amount of data provided in the combined signal.

In an illustrated embodiment, each of the encoders of the multichannel image compression system compresses successive frames of image data from a different video channel. Means are provided for dividing each frame of image data into an equal number of data blocks. This enables the data blocks for each video channel to be processed synchronously by the plurality of encoders. Means are provided for assembling the encoded image data from the plurality of encoders into packets prior to transmission of the combined signal. Each packet contains an equal number of data blocks for each of the different video channels. The coding level command can specify a global coding level that is the same for all of the encoders. In this instance, the coding level control means comprise means for determining the number of data blocks present in a decoder buffer over time. Means responsive to the determining means provide a current global coding level command. A previous global coding level can also be factored into the computation of the current global coding level command.

Decoder apparatus in accordance with the present invention recovers individual channels of compressed image data from a combined signal carrying data for a plurality of said channels. Means are provided for demultiplexing the combined signal to retrieve separate compressed image data provided by each of a plurality of encoders. A plurality of decoders is provided, each coupled to the demultiplexing means for decompressing the image data provided by a corresponding encoder. A coding level command is recovered from data received with the combined signal. The decoders are responsive to the recovered coding level command to decompress the image data.

The coding level command recovered by the decoder apparatus can specify a global coding level that is the same for all of the encoders, and can be multiplexed with the combined signal. The means for recovering the coding level command can comprise a demultiplexer that separates the coding level command from the combined signal. In an alternate embodiment, the means for recovering the coding level command can comprise means responsive to an accumulated amount of data from the combined signal for reproducing the coding level command.

BRIEF DESCRIPTION OF THE DRAWINGS

FIG. 4 is a block diagram of a decoder in accordance with the present invention;

FIG. 5 is a diagrammatic illustration of a plurality of different channel image frames divided into data blocks; and FIG. 6 is a diagrammatic illustration of a sequence of data packets assembled from the data blocks.

DETAILED DESCRIPTION OF THE INVENTION

Figure 1:
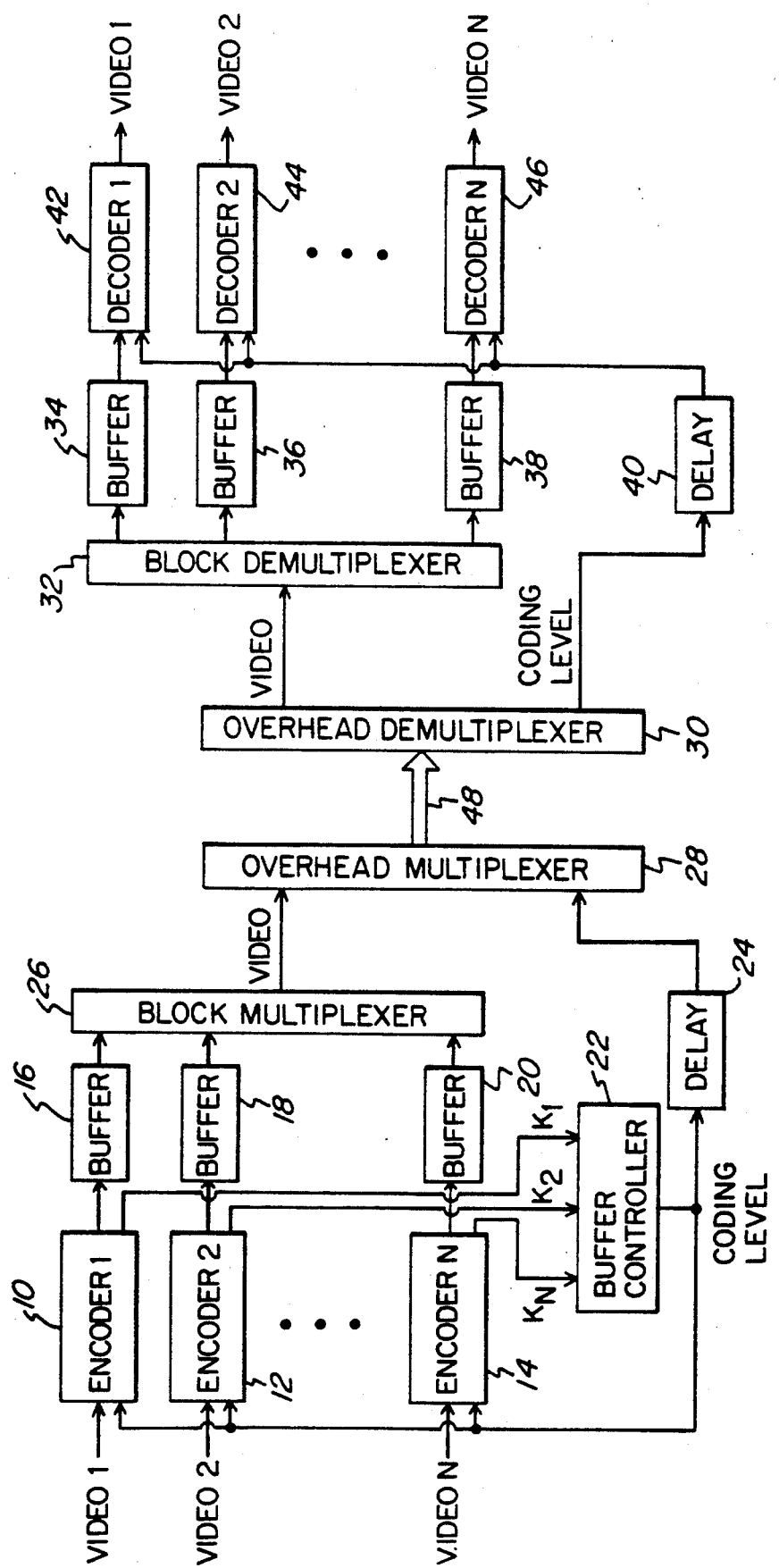
FIG. 1 is a block diagram of a multichannel image compression system in accordance with the present invention.

The present invention implements a statistical multiplexer in a variable bit rate digital video compression system. An example of a variable bit rate digital video compression system can be found in Chen and Pratt, "Scene Adaptive Coder," *IEEE Transactions on Communications*, Vol. COM-32, No. 3, March 1984. Other compression systems are disclosed in U.S. Pat. Nos. 4,887,156 to Ohki entitled "Method and System for Transform Coding of Video Signals," 4,651,206 to Ohki entitled "Inter-frame Coding Apparatus for Video Signal," 4,862,264 to Wells, et al entitled "Method of Coding a Video Signal for Transmission in a Restricted Bandwidth," 4,546,386 to Matsumoto, et al entitled "Adaptive Predictive Coding System for Television Signals," 4,837,618 to Hatori, et al entitled "Moving Image Signal Coding System," and 4,984,076 to Watanabe, et al entitled "Image Compression Coding System."

The multiplexer of the present invention first establishes a global coding level that is observed by each of a plurality of individual video encoders. Each video encoder compresses image data from a different video channel. The coding level establishes the quality level of the video signal after it is reconstructed from the output data produced by the video encoders. For example, each encoder can respond to the global coding level by selecting a corresponding set of quantizers for the data coefficients that are to be transmitted. Thus, if the coding level specifies high reproduction accuracy, then fine quantizers would be used in the encoder. In this case, the amount of data resulting after the quantization stage would be relatively large and would be more likely to remain large after subsequent entropy coding. Rate buffers can be provided to even out short time fluctuations in the data rate. However, if the total amount of data generated by the plurality of encoders continues to exceed the throughput capability of the communication channel over which the combined data is transmitted, then the global coding level is changed in accordance with the invention to reduce the image quality. In this manner, the amount of data produced by the video encoders is reduced. On the other hand, if the amount of data generated continues to be less than the throughput capability of the communication channel, then the coding level is changed to increase the picture quality, thereby efficiently utilizing the available channel bandwidth.

In an alternate embodiment, a local coding level is generated for each of the video encoders. Thus, for example, a particular channel that is determined to be more important than the others may be allowed to operate at one or more levels above the established global level. Similarly, less important channels may be required to operate at one or more levels below the established global level. In addition, the individual channels can be permitted to make small adjustments to the global coding level using a suitable function based on local scene characteristics. For example, if a video region consists of a very active area where artifacts would not be easily noticed, the coding level can safely be adjusted to a somewhat lower quality. For relatively quiet video regions, the coding level could be adjusted to a higher quality level to reduce the occurrence of noticeable artifacts. In fact, any relationship between the global coding level and the local coding level can be specified as long as the amount of information produced continues to respond appropriately as the global level is adjusted.

An advantage of a statistical multiplexer in accordance with the present invention, is that it minimizes the frequency of the coding level changes. If the number of video channels and the size of the rate buffers are sufficiently large, then the probability of an overflow or underflow of data at the decoder can be reduced to almost zero even if the global coding level remains fixed. At the same time, the consistency of video quality provided by the system is improved.

FIG. 1 illustrates, in block diagram form, a statistical multiplexing and demultiplexing system in accordance with the present invention. N different encoders 10, 12, . . . 14 are provided to compress the video signal supplied from N independent video sources. In addition to the video source, each encoder also accepts as an input a global coding level signal supplied from a central buffer controller 22. Each encoder packages the compressed video data into variable size blocks, as well known in the art. As illustrated in FIG. 5, each block 106 represents a small portion of an image frame (e.g., 100, 102, or 104) contained in the original video signal. For example, a block may be defined as the compressed video data corresponding to a certain number of lines, each containing a certain number of pixels, all within the same image frame. Although each block represents a region of fixed size, the amount of data within each block will vary since some regions of the image will compress better than other regions.

FIG. 6 illustrates the assembly of the blocks 106 into packets for transmission. In the illustrated embodiment, each packet 120, 130, 140 starts off with the global coding level signal applicable to the following data. It should be appreciated that the coding level can change less frequently than with each individual packet, and that alternate formats can be used for communicating the coding level to a receiver. Thus, it may not be necessary to provide the coding level at the beginning of each and every packet.

The coding level 108 provided in packets 120, 130 and 140 is followed by the actual data blocks assigned to each packet. As can be seen, each packet contains the same number of data blocks for all of the M channels. Packet 120 includes the first block B1 from the current image frame of each of channels C1, C2, . . . CM as illustrated at 110, 112, and 114, respectively. Packet 130 contains the second block from the image frame for each of the M channels. Packet 140 contains the Nth block from the image frame for each of the channels.

In the example provided in FIG. 6, each packet contains a single data block from each channel. Other packet formats can be substituted, as long as each packet contains the same number of data blocks for each channel. Additional control data can be added to the packets as necessary, for example, in a packet header or footer.

Figure 3:
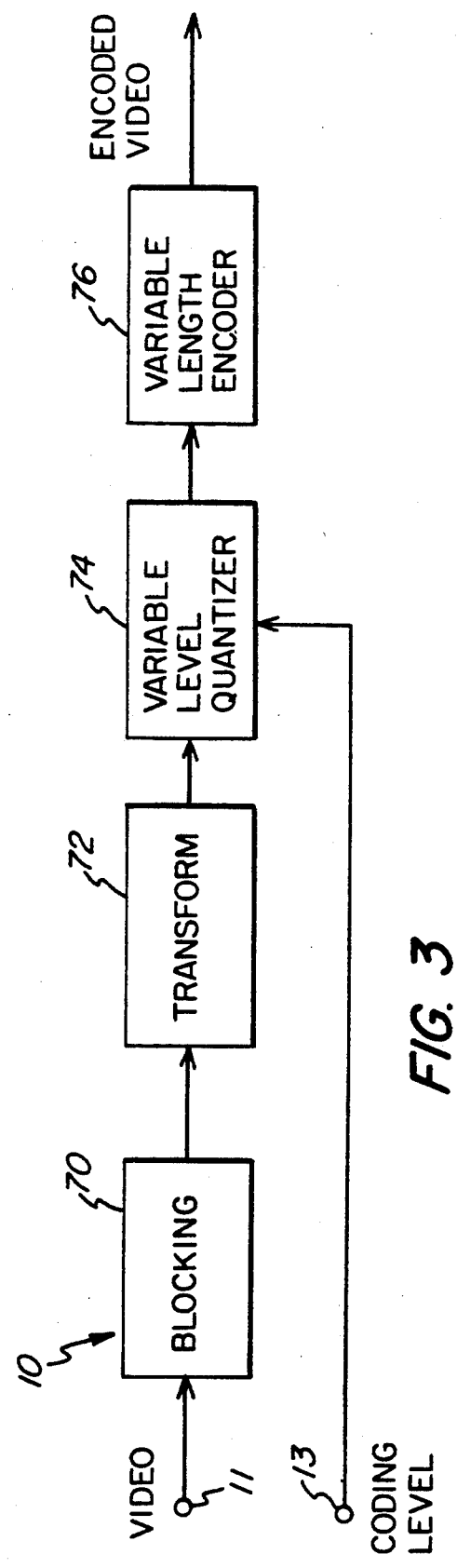
FIG. 3 is a block diagram of an encoder in accordance with the present invention.

A block diagram illustrating one embodiment of the encoders, such as encoder 10, is illustrated in FIG. 3. The video signal is input at a terminal 11 to a blocking circuit 70 that groups the incoming video data into data blocks. The video data is transformed on a block-by-block basis in transform circuitry 72. The transformed data blocks are input to a variable level quantizer 74, in which one of a plurality of sets of quantizers can be selected by inputting a coding level signal via terminal 13. The quantized output is provided to a variable length encoder 76 that can utilize, for example, an optimum statistical coding procedure such as well known Huffman coding.

Transform circuitry 72 can use, for example, the discrete cosine transform (DCT) to transform each block of pixels into a new block of transform coefficients. The transform is applied in turn to each block of video data until an entire image has been transformed. At the decoder, the inverse transformation is applied to recover the original image. The DCT merely transforms an image area from a fixed number of pixels to an equal number of transform coefficients. In order to compress the image, it is necessary to take advantage of an important property of the DCT. In particular, for typical images, a very large proportion of the signal energy is compacted into a small number of transform coefficients.

The transform coefficients received by variable level quantizer 74 are quantized, or "normalized" to introduce small changes into the image in order to improve coding efficiency. This is done by truncating the DCT coefficients to a fixed number of bits. The truncation is performed by shifting a coefficient from left to right, spilling the least significant bits off the end of a register. In this way, the amplitude of the coefficient is also reduced. Normalization improves the compressibility of an image by reducing the amplitude of the transform coefficients.

In order to take advantage of the result, an algorithm for assigning a variable number of bits to these coefficients is required. Thus, a statistical coding technique is provided by variable length encoder 76 which, unlike the normalization process, is information preserving and does not degrade the image. As noted above, Huffman coding can be implemented by variable length encoder 76 to assign variable length code words to the video data. The code words are determined by a code book translation table which assigns short code words to events with the highest probability of occurrence. The decoder maintains an identical code book and is able to match each code word with the actual event.

Since the signals are encoded by the encoder of the present invention in real time, the rate at which blocks are processed is constant. In addition, the plurality of encoders 10, 12, 14 (FIG. 1) are synchronized so that a single block of data is produced simultaneously by each of the N different encoders. The resulting data is deposited into first-in first-out (FIFO) registers or buffers 16, 18, . . . 20 where it is stored until ready to be transmitted over the communication channel 48. A separate buffer is used for each channel to avoid the need for high speed memory devices or memory devices with multiple write access capability. However, those skilled in the art will appreciate that most encoders include a built-in rate buffer at the output. There is therefore no requirement that an additional buffer be introduced for multiplexing. For purposes of the present disclosure, the buffers 16, 18, . . . 20 illustrated in FIG. 1 will also perform the rate buffering function.

The compressed video data output from each of the buffers is multiplexed in a block multiplexer 26. The multiplexed, compressed video data output from block multiplexer 26 is combined in an overhead multiplexer 28 with the global coding level signal output from buffer controller 22, after a suitable delay introduced by delay circuit 24. The resultant combined signal is transmitted via communication path 48 to a receiver that includes apparatus for decoding the received data.

The compressed video data is transmitted by reading K blocks at a time from each of the video buffers. Although K=1 may be the most likely choice since it minimizes the required size of the video buffer, those skilled in the art will appreciate that any integral number of blocks may be selected. Block boundaries must be detected when reading from the buffer. This capability is provided by including the block length at the head of each group of K blocks in each of the encoded signals. Alternatively, a high data link controller (HDLC) protocol may be used to identify the block boundaries.

Each encoder must also send the block size $k_i$, where i is the encoder number, to the buffer controller. This information is used to determine what changes, if any, need to be made to the global coding level. This coding level is fed back to the encoders and is also delayed and multiplexed with the encoded video, as described above, for transmission to the decoder.

In an alternate embodiment, the decoder can determine the coding level by duplicating a similar buffer controller at the decoder site. However, such an embodiment complicates the channel acquisition and error recovery processes.

At the decoder, the global coding level is extracted from the transmitted signal by an overhead demultiplexer 30. The coding level is then made available, after a delay provided by delay circuit 40, to a plurality of decoders 42, 44, . . . 46. The compressed video data output from overhead demultiplexer 30 is again separated into its block components by a block demultiplexer 32. Each block is then deposited into the buffer 34, 36, ... 38 of the corresponding video channel. At the decoder, the same methods are used to identify the block boundaries that were used at the encoder. Channel information is also transmitted, either at the beginning of the block or less frequently, where a regular channel scanning pattern is used.

An example of a decoder in accordance with the present invention is illustrated in FIG. 4. The encoded video is input via terminal 80 to a variable length decoder 84. As noted above, the variable length decoder applies Huffman coding and maintains an identical code book to that used by the encoder. The output of variable length decoder 84 is input to a variable level inverse quantizer 86. The inverse quantization process is controlled by the coding level signal input via terminal 82.

The global coding level is processed as necessary at each decoder to derive the corresponding local coding level, which is then used to inversely quantize the data coefficients that are specific to the particular compression algorithm in use. It should be appreciated that for each of the encoders that used the global coding level as provided, without deriving a different local coding level therefrom, the corresponding decoder would also use the global coding level. In this case, such decoders would not have to derive any distinct local coding levels.

After inverse quantization, the coefficients are inverse transformed (e.g., using an inverse DCT transform) at 88, and provided to a formatter 90 to convert the block formatted data to the original input video format.

Figure 2:
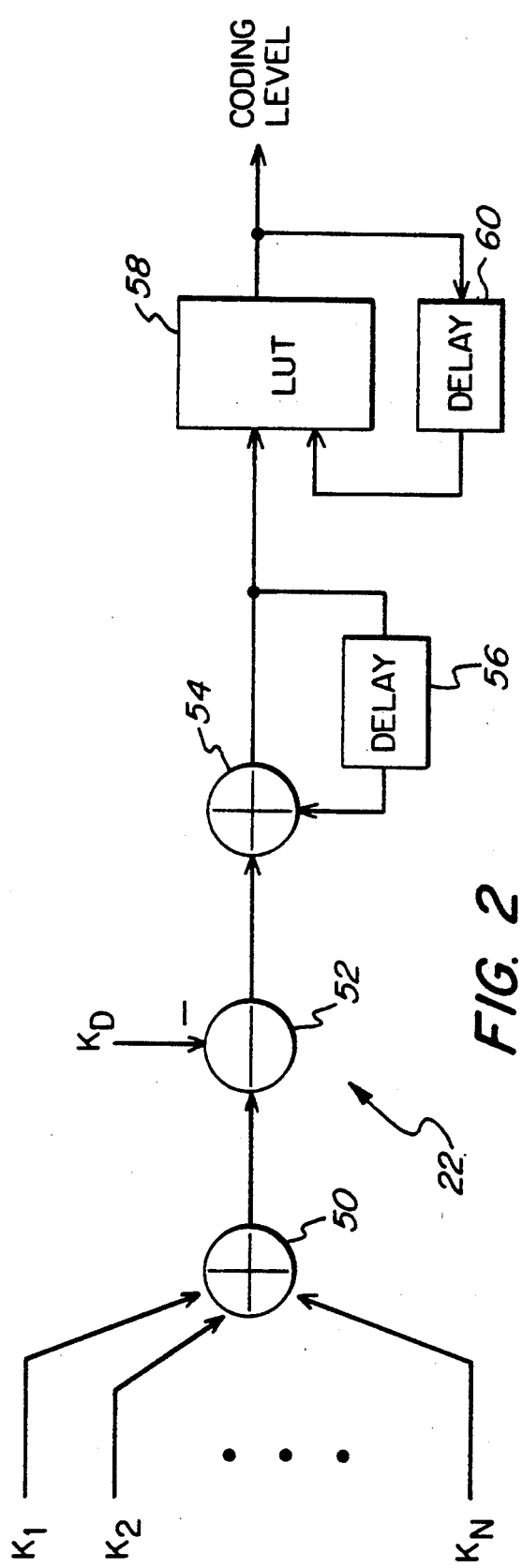
FIG. 2 is a detailed block diagram of the buffer controller illustrated in FIG. 1.

The calculation of the global coding level at the encoders, by buffer controller 22 (FIG. 1), can be provided by the circuit illustrated in FIG. 2. The block lengths $k_i$ from each of the N encoders 10, 12, ... 14 are summed in adder 50 and then decremented in subtracter 52 by $K_D$, where $K_D$ is the number of bits transmitted over the channel during the block time interval. Since the block time interval does not change, $K_D$ will be a constant as long as the buffers do not become empty. The difference between $$\sum_{i=1}^{N} K_i$$

and $K_D$ is the net change in the total buffer size. A number representing the current buffer level is obtained by accumulating this result after each block interval, using summer 54 and delay 56. The current buffer level output from summer 54 is input to a look-up table 58. Look-up table 58 can also optionally receive the previous coding level via delay 60. A new global coding level is then determined by look-up table 58 based on the current buffer level and, if provided, the previous global coding level. The function used to program the look-up table is chosen to prevent the encoder and decoder buffers from becoming either full or empty while, at the same time, avoiding unnecessary coding level changes.

Problems would occur if all of the encoder buffers became empty. It will be appreciated that since each channel is processed synchronously and since the number of blocks that have been transmitted is the same for all channels, it would not be possible for one buffer to become empty unless all of the other buffers were also empty. In the event this did occur, then the encoder would stop sending video data and issue fill bits instead, which would be detected and discarded by the decoder. Transmission of video data would resume after the buffer level had increased sufficiently.

Another problem would occur if any one of the encoder buffers became full. Such a condition must be prevented either by adapting the coding level or preferably by ensuring that the buffer size is sufficient to handle the worst case condition. The worst case condition can be estimated by first noting the delay between the input to the encoder buffer and the output from the decoder buffer. Since the blocks are inserted into the encoder buffer at a fixed rate and withdrawn from the decoder buffer at the same rate, the delay will be time invariant and can be specified during the design of a particular system. The worst case condition would then depend on the compression algorithm, the effectiveness of the buffer controller, and the assumption that all of the compressed image blocks are on the encoder side awaiting transmission.

If the decoder buffer becomes full, another error condition will occur. Although serious, such a situation is easy to prevent. One solution is for the encoder to calculate the current size of the decoder buffer and then retransmit a block each time an overflow occurs. A second solution would be to adjust the coding level before the level can become dangerously high. However, if there were also a large amount of data awaiting transmission on the encoder side, then the effect of a coding level change may not occur fast enough to prevent the overflow from occurring. However, the simplest solution would be to provide the decoder with sufficient buffer memory to handle the worst case conditions. This would eliminate the need for the encoder to monitor the buffer level at the decoder.

Another error condition would occur should the decoder buffer become empty. This condition must be prevented since there is no easy method for recovery. Therefore, the most important function of the buffer controller is to ensure that all of the decoder buffers remain at least partially full. This can be done using the implementation illustrated in FIG. 2.

Since each of the decoder buffers contain the same number of image blocks ($\pm K$), and since the blocks are withdrawn from the buffers at a constant rate, it is more effective to base the coding level adjustment on the number of blocks in each of the decoder buffers rather than on the number of bits in the individual buffers. Thus, buffer controller 22 only calculates the total amount of data in the encoder buffers and not the number of blocks in each of the decoder buffers. However, it is possible to perform either function by proper programming of the look-up table 58.

In computing a current global coding level, buffer controller 22 denotes the amount of data in the N encoder buffers 16, 18, ... 20 by m. The time required for all of this data to be transferred to the decoder buffers is m/r, where r is the throughput of the communication channel. After this time interval, the number of blocks in the decoder buffer is simply the difference between the total number of blocks B in the system, and the number of blocks which have been withdrawn from the decoder buffer during the same time interval. If the rate at which the blocks are removed from the decoder buffer is denoted by <, then the number of blocks in the decoder buffer after the time interval m/r is $$B - \frac{cm}{r}.$$

Therefore, by programming the look-up table 58 to compensate for this relationship, it becomes possible to set the coding level as a function of the number of blocks that will be in each of the decoder buffers after a time interval of m/r.

Delay 60 can be provided to delay the previous coding level in order to provide additional inputs to the look-up table. This allows additional control over the coding level transitions and is useful to introduce hysteresis into the controller. Hysteresis is useful for preventing frequent coding level oscillations.

It should now be appreciated that the present invention provides a multichannel image compression system where each encoder and each decoder responds to a global coding level that is established by a central buffer controller. Each encoder and each decoder will adjust the compression and decompression processes in order to achieve the video quality that is appropriate for the established coding level. Certain encoders and corresponding decoders can be designated to adjust the global coding level to a local coding level, according to a predetermined rule. The local coding level can provide a higher or lower quality for the particular encoder/decoder. Alternatively, all of the encoders can derive local coding levels from the global coding level, depending on predetermined rules. The local coding levels for the different encoders can be the same as or different from the global coding level at any given time.

In a specific implementation of the present invention, each image frame of each channel is divided into a fixed number of block components. The corresponding block components of the different channels are processed synchronously. The compressed data is divided into packets prior to transmission, with each packet containing the same number of blocks from each of the different channels. The global coding level is generated as a function of the number of block components in each of the decoder buffers at some time in the future, according to the time it takes for all of the existing data in the encoder buffers to be transmitted over the channel.

Although the invention has been described in connection with a specific embodiment thereof, those skilled in the art will appreciate that numerous adaptations and modifications may be made thereto without departing from the spirit and scope of the invention as set forth in the claims.

What is claimed is:

1. A multichannel image compression system comprising:
   a plurality of encoders for compressing image data;
   buffer means for accumulating compressed image data from said plurality of encoders;
   coding level control means coupled to provide in coding level command to each of said encoders for specifying a level of quality to be provided by each encoder, said coding level control means being responsive to an accumulated amount of compressed image data in said buffer means for adjusting said coding level command to maintain the accumulated data within a data storage capacity of said buffer means; and
   means for multiplexing encoded image data, provided by said encoders in response to said coding level control means, into a combined signal for transmission.

2. A system in accordance with claim 1 wherein said coding level command specifies a global coding level that is the same for all of said encoders.

3. A system in accordance with claim 2 further comprising:
   means operatively associated with at least one of said encoders for generating a local coding level for use by the encoder that may differ from said global coding level.

4. Decoder apparatus for use in the system of claim 1 comprising:
   means for demultiplexing said combined signal to retrieve the encoded image data provided by each encoder;
   a plurality of decoders, each coupled to said demultiplexing means for decoding the image data provided by a corresponding encoder; and
   means for recovering said coding level command from received data;
   wherein said decoders are responsive to the recovered coding level command to decode the encoded image data.

5. Apparatus in accordance with claim 4 wherein:
   said coding level command specifies a global coding level that is the same for all of said encoders;
   said coding level command is multiplexed with said combined signal prior to transmission; and
   said recovering means comprise a demultiplexer for recovering said coding level command from the combined signal.

6. Apparatus in accordance with claim 5 further comprising:
   means operatively associated with at least one of said encoders for generating a local coding level for use by the encoder that may differ from said global coding level; and
   means operatively associated with a decoder corresponding to said at least one encoder, for reproducing said local coding level for use by the decoder.

7. Decoder apparatus in accordance with claim 4 wherein said recovering means comprise:
   means responsive to an accumulated amount of data from said combined signal for reproducing said coding level command.

8. A multichannel image compression system comprising:
   a plurality of encoders for compressing successive frames of image data from different video channels;
   means for dividing each frame of image data into an equal number of data blocks, enabling the data blocks for each video channel to be processed synchronously by said plurality of encoders;
   coding level control means coupled to provide a coding level command to each of said encoders for specifying a level of quality to be provided by each encoder; and
   means for assembling encoded image data, provided by the plurality of encoders in response to said coding level control means, into packets for transmission as a combined signal, with each packet containing an equal number of data blocks for each of the different video channels.

9. Apparatus in accordance with claim 8 wherein said coding level command specifies a global coding level that is the same for all of said encoders, and said coding level control means comprise:

means for determining the number of data blocks present in a decoder buffer over time; and means responsive to said determining means for providing a current global coding level command.

10. Apparatus in accordance with claim 9 wherein said means responsive to said determining means are also responsive to a previous global coding level for providing said current global coding level command.

11. Apparatus in accordance with claim 8 wherein said coding level command specifies a global coding level that is the same for all of said encoders, and said coding level control means comprise:

means for determining the total amount of data in a plurality of encoder buffers over time; and means responsive to said determining means for providing a current global coding level command.

12. Apparatus in accordance with claim 11 wherein said means responsive to said determining means are also responsive to a previous global coding level for providing said current global coding level command.

13. Decoder apparatus for recovering individual channels of compressed image data from a combined signal carrying data for a plurality of said channels, comprising:

means for demultiplexing said combined signal to retrieve separate compressed image data provided by each of a plurality of encoders;

a plurality of decoders, each coupled to said demultiplexing means for decompressing the image data provided by a corresponding encoder; and means for recovering a coding level command from data received with said combined signal, said coding level command calculated to maintain an accumulated amount of compressed image data from said encoders within a buffer data storage capacity;

wherein said decoders are responsive to the recovered coding level command to decompress said image data.

14. Decoder apparatus in accordance with claim 13 wherein:

said coding level command specifies a global coding level that is the same for all of said encoders;

said coding level command is multiplexed with said combined signal; and said recovering means comprise a demultiplexer for recovering said coding level command from the combined signal.

15. Decoder apparatus in accordance with claim 13 wherein said recovering means comprise:

means responsive to an accumulated amount of data from said combined signal for reproducing said coding level command.

* * * * *

UNITED STATES PATENT AND TRADEMARK OFFICE
CERTIFICATE OF CORRECTION

PATENT NO. : 5,216,503

DATED : June 1, 1993

INVENTOR(S) : W. Paik, et al.

It is certified that error appears in the above-identified patent and that said Letters Patent is hereby corrected as shown below:

Column 1, line 58, "to provide in" should read -- to provide a -- .

Signed and Sealed this

Fourteenth Day of December, 1993

*Attest:*

BRUCE LEHMAN

*Attesting Officer*     *Commissioner of Patents and Trademarks*